(12) United States Patent
Konishi

(10) Patent No.: US 8,187,656 B2
(45) Date of Patent: May 29, 2012

(54) PURIFIED GREEN TEA EXTRACT

(75) Inventor: Tomoko Konishi, Sumida-ku (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 12/598,949

(22) PCT Filed: May 23, 2008

(86) PCT No.: PCT/JP2008/001294
§ 371 (c)(1),
(2), (4) Date: Nov. 5, 2009

(87) PCT Pub. No.: WO2008/146479
PCT Pub. Date: Dec. 4, 2008

(65) Prior Publication Data
US 2010/0136205 A1    Jun. 3, 2010

(30) Foreign Application Priority Data

May 24, 2007    (JP) ............................... 2007-137646
Mar. 5, 2008    (JP) ............................... 2008-054565

(51) Int. Cl.
A23F 3/00    (2006.01)
(52) U.S. Cl. ...................................... 426/597; 426/548
(58) Field of Classification Search ................ 426/597, 426/548
See application file for complete search history.

(56) References Cited

U.S. PATENT DOCUMENTS

| | | | |
|---|---|---|---|
| 4,673,530 A | 6/1987 | Hara | |
| 4,946,701 A * | 8/1990 | Tsai et al. | 426/597 |
| 2003/0096050 A1* | 5/2003 | Inaoka et al. | 426/597 |
| 2005/0095342 A1* | 5/2005 | Ogura et al. | 426/597 |
| 2006/0263454 A1 | 11/2006 | Sugiyama et al. | |
| 2007/0116838 A1* | 5/2007 | Prakash et al. | 426/548 |
| 2007/0292544 A1 | 12/2007 | Hara et al. | |
| 2010/0069429 A1 | 3/2010 | Hara et al. | |

FOREIGN PATENT DOCUMENTS

| | | |
|---|---|---|
| EP | 1 770 090 A1 | 4/2007 |
| JP | 3-133928 | 6/1981 |
| JP | 59-219384 | 12/1984 |
| JP | 1-289447 | 11/1989 |
| JP | 5-153910 | 6/1993 |
| JP | 8-109178 | 4/1996 |
| JP | 2002-142677 | 5/2002 |
| JP | 2002-335911 | 11/2002 |
| JP | 2004-321105 | 11/2004 |
| JP | 2006 129757 | 5/2006 |
| JP | 2006-129757 | 5/2006 |
| JP | 2007 1893 | 1/2007 |
| JP | 2007-1893 | 1/2007 |
| JP | 2007 282607 | 11/2007 |

OTHER PUBLICATIONS

Extended Search Report issued Mar. 16, 2011, in European Patent Application No. 08 751 803.1-2114/2147604.
Notification of Information Offer Form issued Jul. 12, 2011 in Japan Application No. 2008-054565 (With English Translation).
Katsunori Kohata, "Relationship between green tea research and analytical chemistry", Bunseki Kagaku, vol. 51, No. 7, 2002, pp. 479-485 (With English Translation).
Takatoshi Murase et al., "Dietary Tea Catechins Reduce Development of Obesity Accompanied with Gene Expression of Lipid-metabolizing Enzymes in Mice", J. Oleo Sci., vol. 50, No. 9, 2001, pp. 711-715 (With English Translation).

* cited by examiner

*Primary Examiner* — D Lawrence Tarazano
*Assistant Examiner* — Tamra L Amakwe
(74) *Attorney, Agent, or Firm* — Oblon, Spivak, McClelland, Maier & Neustadt, L.L.P.

(57) ABSTRACT

A purified green tea extract is improved in bitterness and aftertaste.
The purified green tea extract, which comprises satisfying the following conditions:
(1) a ratio of a sum of content weights of (A) myricetin, (B) quercetin and (C) kaempferol to a sum of content weights of (D) epigallocatechin gallate and (E) gallocatechingallate, ((A)+(B)+(C))/((D)+(E)), is from 0.0000001 to 0.010,
(2) a sum of content weights of (D) the epigallocatechin gallate and (E) the gallocatechin gallate in non-polymer catechins, ((D)+(E))), is from 0.01 to 29 wt %, and
(3) a percentage of gallate body in the non-polymer catechins is from 0.01 to 49 wt %.

24 Claims, No Drawings

PURIFIED GREEN TEA EXTRACT

FIELD OF THE INVENTION

The present invention relates to a purified green tea extract, and also to a food and beverage containing the same.

BACKGROUND OF THE INVENTION

Catechins are reported to have physiological effects, such as an inhibitory action on α-amylase-activity (Patent Document 1). In order for such effects to materialize, a large amount of catechins must be consumed as easily as possible. Therefore, a technique that makes it possible for a food and drink to contain a high concentration of catechins has been sought.

As one of such conventional techniques, there is a method in which catechins are added to a food and drink (e.g., a beverage) by making use of a tea extract such as a concentrate of green tea extract. However, such a method is known to cause great damage to the commercial value of a food and beverage due to the residual bitterness and astringency stemming from caffeine and green tea, depending on its kind of food and beverage, for example, in the case where catechins are added to a black tea extract or a carbonated beverage.

Adsorption methods (Patent Documents 2 to 4) and extraction methods (Patent Documents 5 to 6) are known as effective for removing impurities (e.g., caffeine) from a tea extract. There are also techniques that have been recently disclosed, which includes improving taste by reducing flavonoids and flavonol aglycons inherently contained in a green tea extract. Examples thereof include a method for reducing the intensity of bitterness of a green tea extract, which contains epigallocatechin gallate and gallocatechin gallate, and providing it with an improved taste by controlling the percentage of gallate body in non-polymer catechins to 50 wt % or higher and flavonoids to 0.0025 or smaller to the sum of the epigallocatechin gallate and gallocatechin gallate (Patent Document 7); and a method for reducing unpleasant bitterness and astringency by controlling the percentage of gallate body in non-polymer catechins to 50 wt % or higher and flavonol aglycons to smaller than 0.002 to the non-polymer catechins (Patent Document 8). However, none of such convention methods have so far succeeded in improving the aftertaste subsequent to an intake, albeit having succeeded in improving bitterness.

[Patent Document 1] JP-A-03-133928
[Patent Document 2] JP-A-05-153910
[Patent Document 3] JP-A-08-109178
[Patent Document 4] JP-A-2002-335911
[Patent Document 5] JP-A-01-289447
[Patent Document 6] JP-A-59-219384
[Patent Document 7] JP-A-2006-129757
[Patent Document 8] JP-A-2007-001893

DISCLOSURE OF THE INVENTION

The present invention provides a purified green tea extract, containing:
epigallocatechin gallate and/or an isomer thereof, and epicatechin gallate and/or an isomer thereof, wherein
(1) a ratio of a sum of content weights of (A) myricetin, (B) quercetin and (C) kaempferol to a sum of content weights of (D) epigallocatechin gallate and (E) gallocatechin gallate, ((A)+(B)+(C))/((D)+(E)), is from 0.0000001 to 0.010;
(2) a sum of content weights of (D) the epigallocatechin gallate and (E) the gallocatechin gallate in non-polymer catechins, ((D)+(E)), is from 0.01 to 29 wt %; and
(3) a percentage of gallate body in the non-polymer catechins is from 0.01 to 49 wt %.

The present invention also provides a food and beverage containing the above-described purified green tea extract.

DESCRIPTION OF PREFERRED EMBODIMENTS

The present invention is to provide a purified green tea extract with reduced bitterness and improved aftertaste, and also a food and beverage containing the purified green tea extract.

The present inventors conducted an investigation with bearing in mind that the reduced bitterness of green tea extract and the improved aftertaste subsequent to an intake are crucial to the continued intake of a tea extract containing a high concentration of catechins. As a result, it was found that for providing a purified green tea extract with reduced bitterness and an improved aftertaste, the percentage of gallate body in non-polymer catechins needs to be reduced along with that of flavonols. A further detailed investigation was conducted by the present inventor, and led to another finding that coloration is also suppressed in such a purified green tea extract.

The present invention provides a purified green tea extract reduced in bitterness, improved in aftertaste and suppressed in coloration. By thus allowing a purified green tea extract to be contained in a food and beverage, a wide range of applications has become possible.

The term "non-polymer catechins" as used herein is a generic term, which collectively encompasses non-epicatechins such as catechin, gallocatechin, catechingallate and gallocatechin gallate, and epicatechins such as epicatechin, epigallocatechin, epicatechingallate and epigallocatechin gallate.

The term "non-polymer catechin gallate" as used herein is a generic term, which collectively embraces catechin gallate, gallocatechin gallate, epicatechin gallate and epigallocatechin gallate. The purified green tea extract according to the present invention may preferably contain epigallocatechin gallate and/or its isomer, and epicatechin gallate and/or its isomer.

The term "the percentage of gallate body in non-polymer catechins" as used herein means the value of the total weight of these four non-polymer catechins to the total weight of the eight non-polymer catechins as expressed in terms of percentage. Further, the term "isomer of epigallocatechin gallate" as used herein means gallocatechin gallate, while the term "isomer of epicatechin gallate" as used herein means catechin gallate.

The term "flavonols" as used herein means myricetin, quercetin and kaempferol, and the term "sum of content weights of flavonols" as used herein means the total weight of these three flavonols. The content weights of these flavonols can be individually quantitated by HPLC separation and analysis.

The term "total polyphenols" as used herein means their content weight as determined in terms of an equivalent amount of gallic acid by the ferrous tartrate method while using ethyl gallate as a standard solution. Further, the content weight of caffeine in the present invention can be quantitated by HPLC separation and analysis.

The ratio of the sum of the content weights of flavanols ((A) myricetin, (B) quercetin and (C) kaempferol) to the sum of the content weights of (D) epigallocatechin gallate and (E) gallocatechingallate, ((A)+(B)+(C))/((D)+(E)), is from 0.0000001 to 0.010, with being preferably from 0.00001 to 0.009, more preferably from 0.0001 to 0.0085, even more preferably from 0.0001 to 0.007.

The percentage of the gallate body in the non-polymer catechins in the present invention is from 0.01 to 49 wt %, with being preferably from 0.1 to 44 wt %, more preferably from 1 to 39 wt %, even more preferably from 5 to 29 wt %.

The sum of the content weights of (D) epigallocatechin gallate and (E) gallocatechingallate in the non-polymer catechins in the present invention, ((D)+(E)), is from 0.01 to 29 wt %, with being preferably from 0.01 to 27 wt %, more preferably from 0.1 to 25 wt %, even more preferably from 1 to 23 wt %.

The fulfillment of the above-described three concurrent requirements by the flavonols, gallate body, and epigallocatechin gallate and its isomer in the purified green tea extract according to the present invention makes it possible to give a reduced bitterness and an improved aftertaste upon taking the purified green tea extract and also to suppress coloration.

To control the ((A)+(B)+(C))/((D)+(E)) to the above-described range, it is necessary to decrease the absolute amount of flavonols in a food and beverage or to relatively decrease flavonols, which are contained in a food and beverage, in relation to the gallate body in catechins. Illustrative is a method that adds the individual ingredients to a food and beverage such that the above-described relationship is met, a method that subjects a green tea extract to adsorbent treatment, such as that to be described subsequently herein, in an alcohol alone or an environment containing an alcohol, a method that subsequent to dispersion or dissolution of a green tea extract in water or a mixed solution of an organic solvent and water, subjects the resulting dispersion or solution to treatment in contact with activated carbon and also with acid clay or activated clay, or a combination thereof.

The content weight ratio of (F) caffeine/(G) non-polymer catechins in the present invention is preferably from 0.0001 to 0.25, more preferably from 0.001 to 0.15, more preferably from 0.001 to 0.1, even more preferably from 0.001 to 0.08. Within this range, caffeine does not become too much upon taking non-polymer catechins, and from the standpoints of bitterness and aftertaste, this range is also preferred.

The content weight ratio of (G) non-polymer catechins to (H) total polyphenols is preferably from 0.80 to 1.2, more preferably form 0.85 to 1.15, even more preferably from 0.9 to 1.1. This range is preferred, because the proportions of ingredients other than the non-polymer catechins existing in the purified green tea extract are lowered.

For the purpose of conveniently taking a great deal of catechins, the purified green tea extract according to the present invention contains preferably from 25 to 95 wt %, more preferably from 40 to 95 wt %, more preferably from 50 to 90 wt %, even more preferably from 55 to 80 wt % of non-polymer catechins in its solid content.

As a green tea extract usable in the present invention, an extract obtained from green tea leaves can be mentioned. Usable tea leaves more specifically include tea leaves prepared from tea leaves available from the Genus *Camellia*, for example, *C. sinensis, C. assamica*, the Yabukita variety, or a hybrid thereof. Such prepared tea leaves include green teas such as sencha (middle-grade green tea), bancha (coarse green tea), gyokuro (shaded green tea), tencha (powdered tea) and kamairicha (roasted tea). It is also possible to use tea leaves subjected to treatment in contact with carbon dioxide in its supercritical state.

As a method for extracting tea, the extraction can be conducted by a conventional method such as stirring extraction, a column method or drip extraction. An organic acid or organic acid salt, such as sodium ascorbate, may be added beforehand to water upon extraction. It is also possible to make combined use of boiling deaeration or an extraction method which is conducted while bubbling an inert gas such as nitrogen gas to eliminate dissolved oxygen, that is, under a so-called non-oxidizing atmosphere. The tea extract obtained as described above can be used as it is or after it is dried or concentrated for the preparation of the purified green tea extract according to the present invention. As the form of the tea extract, a liquid, slurry, semi-solid and solid form can be mentioned.

Instead of employing an extract obtained from tea leaves as a green tea extract for use in the present invention, it is also possible to employ a concentrate of a green tea extract in a form that it is dissolved in or diluted with water or an organic solvent or to employ an extract from tea leaves and a concentrate of a green tea extract in combination.

The term "a concentrate of a tea extract" as used herein means a concentrate of an extract obtained from green tea leaves with hot water or a water-soluble organic solvent, and includes, for example, those prepared by the processes disclosed in JP-A-59-219384, JP-A-04-020589, JP-A-05-260907, JP-A-05-306279 and the like. As a specific green tea extract, a commercially-available crude catechin preparation such as "POLYPHENON" (product of Tokyo FoodTechno Co., Ltd.), "TEAFURAN" (product of ITO EN, LTD.) or "SUNPHENON" (product of Taiyo Kagaku Co., Ltd.) can be used as a solid green tea extract.

From the viewpoints of a reduction in bitterness, an improvement in aftertaste and a suppression in coloration, it is preferred to use, as a raw material for the purified green tea extract in the present invention, one having an ((A)+(B)+(C))/((D)+(E)) weight ratio of from 0.0035 to 0.01 (preferably from 0.004 to 0.0095, more preferably from 0.0045 to 0.009), a non-polymer catechin concentration of from 20 to 50 wt % (preferably from 25 to 45 wt %, more preferably from 30 to 40 wt %), a percentage of gallate body in non-polymer catechins of from 5 to 53 wt % (preferably from 10 to 52 wt %, more preferably from 15 to 49 wt %), and a caffeine/non-polymer catechin content weight ratio of from 0.01 to 0.25 (preferably from 0.01 to 0.22, more preferably from 0.01 to 0.20).

In the present invention, the green tea extract can be purified by bringing the green tea extract into contract with activated carbon and with acid clay and/or activated clay (which may hereinafter be also called "acid clay or the like") either as it is or in a form that it is dispersed or dissolved in water or an aqueous solution of an organic solvent.

No particular limitation is imposed on the order in which the green tea extract is brought into contact with activated carbon and acid clay or the like. There can be mentioned, for example, (1) a method that disperses or dissolves the green tea extract in water or an aqueous solution of organic solvent and then brings the resulting dispersion or solution into contact with activated carbon and acid clay or the like, (2) a method that disperses activated carbon and acid clay or the like in water or an aqueous solution of organic solvent, and then brings the green tea extract into contact with the resulting dispersion, and (3) a method that brings the green tea extract into contact with water or an aqueous solution of organic solvent in the presence of acid clay or the like, and then bringing the resultant mixture into contact with activated carbon. Among these, the method (1) or (3) is preferred. A filtration step may be interposed between the respective steps in each of the methods (1) to (3) and subsequent to separation by filtration, the procedure may then move to the subsequent step.

Upon the contact treatment, it may preferably be conducted by adjusting the pH to a range of from 4 to 6 to obtain a purified green tea extract with non-polymer catechins efficiently extracted therein. To adjust the pH, an organic acid such as citric acid, lactic acid, tartaric acid, succinic acid or malic acid can be added at a weight ratio of the organic acid to the non-polymer catechins (organic acid/non-polymer catechins) in a range of from 0.01 to 0.20.

The contact treatment may be conducted by any method such as batchwise treatment or continuous column treatment. For example, the contact method between the green tea extract and the activated carbon can be conducted by a method such as continuous treatment through an activated carbon column. In general, it is possible to adopt a method that adds powdery activated carbon or the like, stirs the resulting mixture to selectively adsorb caffeine, and then conducts a filter operation to obtain a decaffeinated filtrate or a method that selectively adsorbs caffeine by continuous treatment through a column packed with granular activated carbon or the like.

As the organic solvent for use in the purification of the green tea extract, a water-soluble organic solvent is preferred. Examples include alcohols such as methanol and ethanol, ketones such as acetone, and esters such as ethyl acetate, with ethanol being preferred in view of use in beverages or foods. The water can be deionized water, tap water, natural water or the like, with deionized water being preferred from the standpoint of taste.

The mixing weight ratio of the organic solvent to water may be set preferably at from 60/40 to 97/3, more preferably at from 60/40 to 75/25, even more preferably from 85/15 to 95/5 from the standpoint of the extraction efficiency of non-polymer catechins, the purification efficiency of the green tea extract, and the like.

As the proportions of the green tea extract and the water or the aqueous solution of organic solvent, the green tea extract (dry weight basis) can be added in a proportion of preferably from 10 to 40 weight parts, more preferably from 10 to 30 weight parts, even more preferably from 15 to 30 weight parts to 100 weight parts of the mixed solution or the like, because the green tea extract can be efficiently treated.

For the contact treatment, it is preferred to include an aging time of from 10 to 180 minutes or so. Such treatment can be conducted at from 10 to 60° C., preferably at from 10 to 50° C., more preferably at from 10 to 40° C.

No particular limitation is imposed on the activated carbon to be used for the contact treatment insofar as it is generally used on an industrial level. Usable examples include commercially-available products such as "ZN-50" (product of Hokuetsu Carbon Industry Co., Ltd.), "KURARAY COAL GLC", "KURARAY COAL PK-D" and "KURARAY COAL PW-D" (products of Kuraray Chemical K.K.), and "SHIROWASHI AW50", "SHIROWASHI A", "SHIROWASHI M" and "SHIROWASHI C" (products of Takeda Pharmaceutical Company Limited).

The pore volume of the activated carbon may be preferably from 0.01 to 0.8 mL/g, more preferably from 0.1 to 0.8 mL/g. Concerning the specific surface area, on the other hand, one having a specific surface area in a range of from 800 to 1,600 $m^2/g$, preferably from 900 to 1,500 $m^2/g$ is preferred. It is to be noted that these physical values are those determined by the nitrogen adsorption method.

The activated carbon can be added preferably in a proportion of from 0.5 to 8 weight parts, more preferably from 0.5 to 3 weight parts to 100 weight parts of the water or the aqueous solution of organic solvent because of decaffeination efficiency and smaller cake resistance in the filtration step.

The acid clay and activated clay for use in the contact treatment both contain, as general chemical components, $SiO_2$, $Al_2O_3$, $Fe_2O_3$, CaO, MgO, etc., and those having $SiO_2/Al_2O_3$ ratios of from 3 to 12, preferably from 4 to 9 are preferred. Also preferred are those which have compositions containing from 2 to 5 wt % of $Fe_2O_3$, from 0 to 1.5 wt % of CaO and from 1 to 7 wt % of MgO.

Activated clay is obtained by treating a naturally-mined acid clay (montmorillonite clay) with a mineral acid such as sulfuric acid, and is a compound having a porous structure of large specific surface area and adsorptive capacity. Further treatment of acid clay with an acid is known to change its specific surface area such that its decolorizing ability is enhanced and its physical properties are modified.

The specific surface areas of acid clay and activated clay is preferably from 50 to 350 $m^2/g$ although they vary depending on the degree or the like of the acid treatment, and their pHs (5 wt % suspensions) is preferably from 2.5 to 8, more preferably from 3.6 to 7. As acid clay, for example, a commercially-available product such as "MIZUKA-ACE #600" (product of Mizusawa Industrial Chemicals, Ltd.) can be used.

The ratio of activated carbon to acid clay or the like may be preferably from 1 to 10 of acid clay or the like to 1 activated carbon in terms of weight ratio, with activated carbon:acid clay or activated clay=1:1 to 1:6 being preferred.

Acid clay or the like can be added preferably in a proportion of from 2.5 to 25 weight parts, more preferably in a proportion of from 2.5 to 15 weight parts to 100 weight parts of water or the aqueous solution of organic solvent. The addition of acid clay or the like in an unduly small proportion tends to lead to a deterioration in decaffeination efficiency, while the addition of acid clay or the like in an excessively large proportion tends to lead to an increase in cake resistance in the filtration step.

Upon separation of the activated carbon or the like from the water or the aqueous solution of organic solvent, the temperature is preferably from −15 to 78° C., more preferably from −5 to 40° C. Outside this temperature range, the separation performance may become inferior, and some changes may be observed in the properties of the solution in some instances.

As a separation method, a conventionally-known technology can be used. For example, the separation may be effected by passing the water or the aqueous solution of organic solvent through a column packed with a granular substance such as activated carbon, instead of a method such as so-called filter separation or centrifugal separation.

In the present invention, a synthetic adsorbent can also be used upon purifying the green tea extract. A synthetic adsorbent is generally an insoluble polymer of three-dimensionally-crosslinked structure, and is substantially free of functional groups such as ion-exchanging groups. Preferably, one having ion exchange capacity of lower than 1 meq/g can be used. As synthetic adsorbents for use in the present invention, synthetic adsorbents having styrene-based matrices, for example, "AMBERLITE XAD4, XAD16HP, XAD1180, XAD2000" (supplier: Rohm & Haas USA), "DIAION HP20, HP21" (products of Mitsubishi Chemical Corporation), "SEPABEADS SP850, SP825, SP700, SP70" (products of Mitsubishi Chemical Corporation), and "VPOC1062" (product of Bayer AG); synthetic adsorbents having modified styrene-based matrices with adsorptive capacity enhanced by nuclear substitution with bromine atoms, for example, "SEPABEADS SP205, SP206, SP207" (products of Mitsubishi Chemical Corporation); synthetic adsorbents having methacrylic matrices, for example, "DIAION HP1MG, HP2MG" (products of Mitsubishi Chemical Corporation); synthetic adsorbents having phenol-based matrices, for example, "AMBERLITE XAD761" (product of Rohm & Haas, Inc.); synthetic adsorbents having acrylic matrices, for example, "AMBERLITE XAD7HP" (product of Rohm &

Haas, Inc.); synthetic adsorbents having polyvinyl matrices, for example, "TOYOPEARL HW-40C" (product of TOSOH CORPORATION); and synthetic adsorbents having dextran-based matrices, for example, "SEPHADEX LH-20" (product of Pharmacia AB) can be used.

As a synthetic adsorbent, its matrix may preferably be of a styrene base, methacrylic base, acrylic base or polyvinyl base, with a styrene base being preferred from the standpoint of separability between catechins and caffeine.

As a manner of adsorbing the green tea extract on the synthetic adsorbent in the present invention, it is possible to adopt a batch method that adds the synthetic adsorbent to the green tea extract, stirs the mixture, and subsequent to adsorption, recovers the synthetic adsorbent by a filter operation; or a column method that performs adsorption treatment through continuous treatment by using a column packed with the synthetic adsorbent, with the continuous treatment method by the column being preferred from the standpoint of productivity. The amount of the adsorbent to be used may be preferably 10 vol %, more preferably 15 vol %, even more preferably 20 vol % based on the green tea extract from the standpoint of the efficiency of adsorption or the like of non-polymer catechins.

The column with the synthetic adsorbent packed therein may preferably be washed beforehand with a 95 vol % aqueous solution of ethanol at SV (space velocity)=0.5 to 10 $[h^{-1}]$ under pass-through conditions of from 2 to 10 [v/v] as a flow ratio to the synthetic adsorbent to remove the raw monomer (s) for the synthetic adsorbent and other impurities and the like. The adsorptive capacity for non-polymer catechins can be enhanced by a method that subsequently conducts washing with water at SV=0.5 to 10 $[h^{-1}]$ under pass-through conditions of from 1 to 60 [v/v] as a flow ratio to the synthetic adsorbent to remove ethanol and hence to replace the liquid medium, which is contained in the synthetic adsorbent, with a water-based system.

As conditions for passing the green tea extract through the column, the concentration of the non-polymer catechins in the green tea extract upon having the non-polymer catechins adsorbed on the synthetic adsorbent is preferably from 0.1 to 22 wt %, more preferably from 0.1 to 15 wt %, more preferably from 0.5 to 10 wt %, even more preferably from 0.5 to 3 wt % from the standpoint of the efficiency of adsorption on the resin.

As conditions for passing the green tea extract through the column packed with the synthetic adsorbent, it is preferred to perform the passing through at a flow velocity of SV (space velocity)=0.5 to 10 $[h^{-1}]$ and a flow ratio of from 0.5 to 20 [v/v] to the synthetic adsorbent. A flow velocity lower than 10 $[h^{-1}]$ and a flow ratio smaller than 20 [v/v] result in sufficient adsorption of the non-polymer catechins.

It is preferred to wash the synthetic adsorbent with water or an aqueous solution of organic solvent after the adsorption of the green tea extract. As the aqueous solution for use in washing the synthetic adsorbent, water of pH 7 or lower is preferred from the standpoint of the recovery rate of non-polymer catechins, and may also be used as a mixed system with a water-soluble organic solvent. As the water-soluble organic solvent, acetone, methanol, ethanol or the like can be mentioned, with ethanol being preferred from the viewpoint of use in beverages and foods. The concentration of the contained organic solvent may be preferably from 0 to 20 wt %, more preferably from 0 to 10 wt %, even more preferably from 0 to 5 wt % from the standpoint of the recovery rate of non-polymer catechins.

In this washing step, it is preferred to remove impurities, which have adhered on the synthetic adsorbent, at a flow velocity of SV (space velocity)=0.5 to 10 $[h^{-1}]$ and a flow ratio of from 1 to 10 [v/v] to the synthetic adsorbent. From the standpoints of impurity removing effects and the recovery rate of non-polymer catechins, it is more preferred to conduct the washing at a flow velocity of SV=0.5 to 5 $[h^{-1}]$ and a flow ratio of from 1 to 5 [v/v].

Non-polymer catechins are then eluted with an aqueous solution of organic solvent or a basic aqueous solution.

As the aqueous solution of organic solvent, a mixed system of a water-soluble organic solvent and water is used. As the water-soluble organic solvent, acetone, methanol, ethanol or the like can be mentioned. Of these, ethanol is preferred from the viewpoint of use in beverages and foods. The concentration of the water-soluble organic solvent may be preferably from 20 to 70 wt %, more preferably from 30 to 60 wt %, even more preferably 30 to 50 wt % from the standpoint of the recovery rate of non-polymer catechins.

As the basic aqueous solution for use in the elution of non-polymer catechins, an alkaline aqueous solution of an alkali metal salt or alkaline earth, preferably a sodium-containing alkaline aqueous solution, for example, an aqueous solution of sodium hydroxide, an aqueous solution of sodium carbonate or the like can be used suitably. The pH of the alkaline aqueous solution is preferably in a range of from 7 to 14, and from the standpoint of the recovery rate of non-polymer catechins, from 9 to 14.0 is more preferred, with from 10 to 13.5 being even more preferred. As the sodium-containing aqueous solution of pH 7 to 14, a 4% or lower aqueous solution of sodium hydroxide, a 1 N aqueous solution of sodium carbonate or the like can be mentioned. A basic aqueous solution and a water-soluble organic solvent may be used as a mixture. From the standpoint of separability between caffeine and catechins, the concentration of the organic solvent is preferably in a range of from 0 to 90 wt %, more preferably from 0 to 50 wt %, even more preferably from 0 to 20 wt %.

In the elution step, two or more basic aqueous solutions different in pH from each other can be used as basic aqueous solutions for the elution, and in the ascending order of pH, these basic aqueous solutions can be brought into contact with the synthetic adsorbent. At the respective pH levels, different non-polymer catechins and other components can be desorbed.

It is preferred to elute non-polymer catechins at a flow velocity of SV (space velocity)=2 to 10 $[h^{-1}]$ and a flow ratio of from 1 to 30 [v/v] to the synthetic adsorbent. From the standpoints of productivity and the recovery rate of non-polymer catechins, it is more preferred to conduct the elution at a flow velocity of SV=3 to 7 $[h^{-1}]$ and a flow ratio of from 3 to 15 [v/v].

The synthetic adsorbent employed in the present invention can be reused by a predetermined method after the purification treatment. Specifically, an organic solvent such as ethanol is passed through to desorb unnecessary components such as caffeine adsorbed on the synthetic adsorbent. As an alternative, it is possible to pass an aqueous solution of an alkali such as sodium hydroxide through or to conduct washing with such an aqueous solution to desorb all water-soluble components remaining on the synthetic adsorbent. Additionally, washing with steam may be combined further.

The eluate obtained as a result of the elution of non-polymer catechins with the basic aqueous solution is basic. From the viewpoint of the stability of non-polymer catechins, however, the pH of the eluate generally is adjusted preferably to 7 or lower, more preferably to from 1 to 6, more preferably to from 1 to 5, even more preferably to from 2 to 4. Specifically, it is possible to use the neutralization with an acid, or the removal of alkali metal ions by electrodialysis, or the removal of alkali metal ions with an ion exchange resin. As the ion exchange resin, the use of an H⁺cation-exchange resin is preferred. For the simplicity of the process, it is preferred to adjust the pH with an ion exchange resin. As the cation exchange resin, it is possible to use specifically "AMBER-LITE 200CT, IR120B, IR124 or IR118" (suppler: Rohm & Haas USA), "DIAION SK1B, SK1BH, SK102, PK208 or PK212" (product of Mitsubishi Chemical Corporation), or the like.

For improved taste and product stability, it is preferred to concentrate the eluate of non-polymer catechins and then to remove precipitated impurities by solid-liquid separation. The concentration can be practiced by reduced-pressure distillation, thin film distillation, membrane concentration or the like. The concentration ratio is preferably from 2 to 500 times, more preferably from 2 to 250 times, even more preferably from 2 to 125 times from the standpoints of taste and the separability of precipitates. The concentration of non-polymer catechins after the concentration is preferably from 0.1 to 70 wt %, more preferably from 0.2 to 50 wt %, even more preferably from 0.5 to 25 wt % from the standpoints of taste and the separability of precipitates. As a specific operation for the solid-liquid separation, filtration and/or centrifugal separation or the like can be mentioned. The turbidity of an aqueous solution of green tea extract, which is obtainable as a water-soluble fraction by subjecting the aqueous solution of green tea extract to solid-liquid separation, may preferably be from 0.1 to 100 NTU, more preferably from 0.5 to 70 NTU, far more preferably from 1 to 50 NTU from the standpoints of the taste and stability of the beverage.

As a solid-liquid separation method, any method usable in the food industry can be applied. As membrane filtration conditions upon conducting the solid-liquid separation by membrane filtration, for example, the temperature is preferably from 5 to 70° C., more preferably from 10 to 40° C. From the standpoint of achieving a predetermined turbidity, the membrane pore size ranges preferably from 0.1 to 10 μm, more preferably from 0.1 to 5 μm, even more preferably from 0.1 to 2 μm in view of the time required for the filtration and the separability of turbid components. As a measuring method of the membrane pore size, a general measuring method making use of mercury intrusion porosimetry, the bubble point test, bacterial filtration porosimetry or the like can be mentioned. It is, however, preferred to use a value determined by the bubble point test. As the material of membranes for use in the membrane filtration, high-molecular membranes, ceramic membranes, stainless steel membranes or the like can be used.

As a centrifugator, conventional equipment such as a separation-plate-type centrifugator, cylinder-type centrifugator or decanter-type centrifugator is preferred. As conditions for centrifugal separation, the temperature can be preferably from 5 to 70° C., more preferably from 10 to 40° C., and the rotational speed and time may desirably be set under conditions adjusted to give a predetermined turbidity. In the case of a separation-plate-type centrifugator, for example, the rotational speed ranges preferably from 3,000 to 10,000 rpm, more preferably from 5,000 to 10,000 rpm, even more preferably from 6,000 to 10,000 rpm, and the time ranges preferably from 0.2 to 30 minutes, more preferably from 0.2 to 20 minutes, even more preferably from 0.2 to 15 minutes.

From the viewpoint of the stability of the color tone of a beverage, it is preferred to decolorize the eluate of non-polymer catechins. As a specific decolorizing operation, decolorization can be achieved by bringing the purified green tea extract into contact with at least one material selected from activated carbon, activated clay and acid clay either as it is or after it is dispersed or dissolved in water or an aqueous solution of organic solvent. It is to be noted that as a contact treatment method, a method similar to the above-described method can be adopted.

When it is desired to further reduce bitterness, the green tea extract can be treated with an enzyme having tannase activity. From the standpoint of taste, it is preferred to conduct enzyme treatment before the adsorption on the synthetic adsorbent. Of these, tannase is preferred. Tannase obtainable by culturing, for example, a tannase-producing fungus of *Aspergillus, Penicillium* or *Rhizopus* can be mentioned. More preferred is tannase available from *Aspergillus oryzae*.

Described specifically, among products commercially available as enzymes having tannase activity, "PECTINASE PLAMANO" (product of Amano Enzyme Inc.), "HEMISEL-LULASE AMANO 90" (product of Amano Enzyme Inc.), "TANNASE KTFH" (product of Kikkoman Corporation), and the like can be used. The treatment with the enzyme having tannase activity, that is, the enzyme reaction, which may be conducted in the present invention, may be conducted suitably with tannin acylhydrolase EC 3.1.1.20 or the like. As commercial products, "TANNASE" (trade name, product of Kikkoman Corporation), tannase "SANKYO" (product of Sankyo Co., Ltd.) and the like can be mentioned.

The enzyme having tannase activity, which is usable in the present invention, may preferably have an enzyme activity of from 500 to 100,000 U/g. An enzyme activity of lower than 500 U/g requires a great deal of enzyme in order to complete the treatment in an industrially-limited time, while an enzyme activity higher than 100,000 U/g leads to an excessively high enzyme reaction rate and hence, makes it difficult to control the reaction system. It is to be noted that "1 Unit" indicates an amount of enzyme that hydrolyses 1 micromole of ester bonds, which are contained in tannic acid, in water of 30° C. It is also to be noted that the expression "having tannase activity" as used herein means to have activity to degrade tannin and any desired enzyme can be used insofar as it has this activity.

The concentration of non-polymer catechins upon conducting treatment with the enzyme having tannase activity is preferably from 0.1 to 22 wt %, more preferably from 0.1 to 15 wt %, more preferably from 0.5 to 10 wt %, even more preferably from 0.5 to 3 wt %.

The enzyme having tannase activity is added preferably at from 1 to 300 Units/g-non-polymer catechins, more preferably at from 3 to 200 Units/g-non-polymer catechins, even more preferably at from 5 to 150 Units/g-non-polymer catechins, all, based on the non-polymer catechins in the green tea extract.

The temperature of the enzyme treatment is preferably from 0 to 70° C. at which optimal enzyme activity is available, with from 0 to 60° C. being more preferred and from 5 to 50° C. being even more preferred.

For the termination of the enzyme reaction, the enzyme activity is inactivated. The enzyme inactivation temperature may preferably be from 70 to 100° C., and the holding time of this temperature may preferably be from 10 seconds to 20 minutes. If the inactivation temperature is too low, the enzyme can hardly be inactivated to any sufficient extent in a short time, so that the reaction proceeds and cannot be terminated within the desired range of the percentage of gallate body in non-polymer catechins. If the holding time after the arrival at the inactivation temperature is too short, on the other hand, the enzyme activity can be hardly inactivated to any sufficient extent so that the enzyme reaction proceeds. If the holding time is too long, on the other hand, non-epimerization of non-polymer catechins may take place in some instances. Accordingly, such an excessively short or long holding time is not preferred.

As an inactivation method for the enzyme reaction, it is possible to terminate the enzyme reaction by conducting heating batchwise or in such a continuous manner as in a plate-type heat exchanger. Further, the tea extract can be cleaned up by an operation such as centrifugal separation subsequent to the completion of the inactivation of the tannase treatment.

The purified green tea extract obtained as descried above can be adjusted to have a non-polymer catechin concentration of 0.2 wt % so that the value of absorbance (OD480) as measured at 480 nm by a spectrophotometer can be controlled to 0.06 or lower, preferably to 0.05 or lower, more preferably 0.04 or lower.

Therefore, the purified green tea extract according to the present invention is not only reduced in bitterness and improved in aftertaste but also suppressed in coloration so that a wide variety of applications can be developed. For example, the purified green tea extract according to the present invention can be used by mixing it in foods or beverages as it is. In such applications, the solvent may be removed by a method such as reduced-pressure concentration or membrane concentration. When a powder is desired as the product form of the purified green tea extract, powderization is feasible by a method such as spray dry or freeze dry. As the purified green tea extract obtained by the present invention has been reduced in bitterness and improved in aftertaste, it can be mixed as an ingredient in not only beverages but also various foods. Among such applications, the application as a packaged beverage is more preferred.

The control of the concentration of non-polymer catechins in a food or packaged beverage making use of the purified green tea extract according to the present invention to from 0.05 to 0.5 wt %, preferably from 0.06 to 0.5 wt %, more preferably from 0.08 to 0.5 wt %, more preferably from 0.092 to 0.4 wt %, more preferably from 0.11 to 0.3 wt %, even more preferably from 0.12 to 0.3 wt % is preferred in that a food or packaged beverage of a good taste having depth without any coarse taste can be obtained.

The addition of a bitterness/astringency suppressor to the packaged beverage according to the present invention facilitates its drinking, and therefore, is preferred. As the bitterness/astringency suppressor to be used, a cyclodextrin is preferred. As the cyclodextrin, an α-, β- or γ-cyclodextrin or a branched α-, β- or γ-cyclodextrin can be used. To the packaged beverage according to the present invention, additives such as antioxidants, flavorings, various esters, organic acids, organic acid salts, inorganic acids, inorganic acid salts, inorganic salts, colors, emulsifiers, preservatives, seasoning agents, sweeteners, sour seasonings, gums, oils, vitamins, amino acids, fruit extracts, vegetable extracts, flower honey extracts, pH regulators and quality stabilizers may be added either singly or in combination.

The pH of the packaged beverage according to the present invention may be controlled preferably to from 2 to 7, more preferably to from 2 to 6.5 at 25° C. from the standpoints of taste and the stability of non-polymer catechins.

In the packaged beverage according to the present invention, it is also preferred, from purpose of assuring a minimum daily intake to obtain the physiological effects of non-polymer catechins, to mix non-polymer catechins in an amount of 300 mg or more, preferably 450 mg or more, more preferably 500 mg or more per can or bottle (350 to 500 mL) of the packaged beverage according to the present invention.

As a package usable for the packaged beverage according to the present invention, the packaged beverage can be provided in a conventional form such as a molded package made of polyethylene terephthalate as a principal component (the so-called PET bottle), a metal can, a paper package combined with metal foils or plastic films, or a bottle.

The above-described packaged beverage can be produced, for example, by filling the beverage in a package such as a metal can and, when heat sterilization is feasible, conducting heat sterilization under sterilization conditions as prescribed in the Food Sanitation Act of Japan. For those which cannot be subjected to retort sterilization like PET bottles or paper packages, a process is adopted such that the beverage is sterilized beforehand at a high temperature for a short time under similar sterilization conditions as those described above, for example, by a plate-type heat exchanger or the like, is cooled to a particular temperature, and is then filled in a package. Under aseptic conditions, additional ingredients may be mixed to and filled in a beverage-filled package.

EXAMPLES (1) Measurements of Non-Polymer Catechins and Caffeine

A high-performance liquid chromatograph (model: "SCL-10AVP") manufactured by Shimadzu Corporation was used. The chromatograph was fitted with a liquid chromatograph column packed with octadecyl-introduced silica gel, "L-Column, TM ODS" (4.6 mm in diameter×250 mm; product of Chemicals Evaluation and Research Institute, Japan). A sample solution, which had been subjected to filtration through a filter (0.45 μm), was measured at a column temperature of 35° C. by the gradient elution method. A mobile phase, Solution A, was a solution containing acetic acid at 0.1 mol/L in distilled water, while another mobile phase, Solution B, was a solution containing acetic acid at 0.1 mol/L in acetonitrile. The measurement was conducted under the conditions of 1 mL/min flow rate, 10 μL sample injection volume and 280 nm UV detector wavelength. It is to be noted that conditions for the gradient elution were as follows.

| Time (min) | Conc. of eluent A (vol %) | Conc. of eluent B |
|---|---|---|
| 0 | 97% | 3% |
| 5 | 97% | 3% |
| 37 | 80% | 20% |
| 43 | 80% | 20% |
| 43.5 | 0% | 100% |
| 48.5 | 0% | 100% |
| 49 | 97% | 3% |
| 60 | 97% | 3% |

(2) Measurements of Myricetin, Quercetin and Kaempferol (Flavonols)

A high-performance liquid chromatograph (model: "Waters 2695") manufactured by Waters Corporation was used. The chromatograph was fitted with a column, "Shimpach VP ODS" (150×4.6 mm I.D.). A sample solution, which had been subjected to filtration through a filter (0.45 μm), was measured at a column temperature of 40° C. by the gradient elution method. A mobile phase, Solution A, was a solution containing phosphoric acid at 0.05% in distilled water, while another mobile phase, Solution B, was a methanol solution. The measurement was conducted under the conditions of 1 mL/min flow rate, 10 μL sample injection volume and 368 nm UV detector wavelength. It is to be noted that conditions for the gradient elution were as follows.

| Time (min) | Conc. of eluent A (vol %) | Conc. of eluent B |
|---|---|---|
| 0 | 95% | 5% |
| 20 | 80% | 20% |
| 40 | 30% | 70% |
| 41 | 0% | 100% |
| 46 | 0% | 100% |
| 47 | 95% | 5% |
| 60 | 95% | 5% |

(3) Measurement of Total Polyphenols

Using ethyl gallate as a standard solution, total polyphenols was measured in terms of an equivalent amount of gallic acid by the ferrous tartrate method (referential publication: "Green Tea Polyphenols", Technology Series for the Effective Utilization of Functional Ingredients for Beverages and Foods, No. 10). A sample (5 mL) was stained with the standard ferrous tartrate solution (5 mL). With a phosphate buffer, the volume of the thus-stained sample was adjusted to 25 mL. Its absorbance was measured at 540 nm, and from a calibration line for ethyl gallate, the total polyphenols was determined. Preparation of the standard ferrous tartrate solution: Ferrous sulfate heptahydrate (100 mg) and potassium sodium tartrate (Rochelle salt) (500 mg) were dissolved with distilled water to 100 mL. Preparation of the phosphate buffer: 1/15 M disodium hydrogenphosphate and 1/15 M sodium dihydrogenphosphate were mixed to give pH 7.5.

(4) Measurement of Solid Content

A sample (about 1 g) was weighed, dried at 105° C. for 3 hours or longer, and then weighed. The solid content was then calculated in accordance with the following formula:

Solid Content

=Weight after drying/weight before drying×100

(5) Measurement of OD480

A sample solution, which had been adjusted to a non-polymer catechin concentration of 0.2 wt %, was measured for absorbance at 480 nm by a spectrophotometer ("Model U2810") manufactured by Hitachi, Ltd.

(6) Evaluation of Bitterness and Aftertaste by the Quinine Sulfate Method (the Equivalent Concentration Test Method)

Quinine sulfate dihydrate was adjusted to concentrations corresponding to the bitterness intensities shown in a table. After each evaluation sample was tasted, a determination was made concerning to which one of the standard bitterness solutions the intensity of bitterness was equal. The bitterness intensity and aftertaste were confirmed by a group of five panelists. (References: Newly-edited "Organoleptic Test Handbook" in Japanese, PP 448-449, Organoleptic Test Committee, Union of Japanese Scientists and Engineers; Perception & Psychophysics, 5, pp. 347-351, 1696).

TABLE 1

Concentrations of Standard Bitterness Solutions

| Bitterness intensity | Quinine sulfate dihydrate (g/100 mL aq.) |
|---|---|
| 1 | 0.00023 |
| 2 | 0.00050 |
| 3 | 0.00094 |
| 4 | 0.00157 |
| 5 | 0.00241 |
| 6 | 0.00388 |

TABLE 1-continued

Concentrations of Standard Bitterness Solutions

| Bitterness intensity | Quinine sulfate dihydrate (g/100 mL aq.) |
|---|---|
| 7 | 0.00608 |
| 8 | 0.00985 |
| 9 | 0.01572 |
| 10 | 0.02568 |

Production Example 1

"Green Tea Extract 1"

Hot water of 88° C. (45 kg) was added to green tea leaves (produce of Kenya, large leaf variety; 3 kg), and the resulting mixture was stirred for 60 minutes to conduct batchwise extraction. After coarse filtration through a 100-mesh screen, a centrifugal separation operation was then performed to remove fine powder from the extract so that a "green tea extract" (36.8 kg, pH 5.3) was obtained (the concentration of non-polymer catechins in the green tea extract=0.88 wt %, the percentage of gallate body in the non-polymer catechins=51.6 wt %, caffeine=0.17 wt %). A portion of the green tea extract was freeze-dried to obtain a "green tea extract 1". In the "green tea extract 1", the concentration of non-polymer catechins=32.8 wt %, the percentage of gallate body in the non-polymer catechins=51.6 wt %, caffeine/non-polymer catechins ratio=0.193.

Production Example 2

"Green Tea Extract 2"

Hot water of 88° C. (45 kg) was added to green tea leaves (produce of Kenya, large leaf variety; 3 kg), and the resulting mixture was stirred for 60 minutes to conduct batchwise extraction. After coarse filtration through a 100-mesh screen, a centrifugal separation operation was then performed to remove fine powder from the extract so that a "green tea extract" (36.8 kg, pH 5.3) was obtained (the concentration of non-polymer catechins in the green tea extract=0.88 wt %, the percentage of gallate body in the non-polymer catechins=51.6 wt %, caffeine=0.17 wt %). The green tea extract was kept at a temperature of 15° C., and tannase ("TANNASE KTFH", product of Kikkoman Corporation; 500 U/g) was then added to the green tea extract to give a concentration of 430 ppm. The solution was held for 55 minutes and was then heated to 90° C., at which the solution was held for 2 minutes to inactivate the enzyme so that the reaction was terminated (pH 5.2). Concentration processing was then performed under conditions of 70° C. and 6.7 kpa to a Brix concentration of 20% by reduced-pressure concentration. Further, the concentrate was spray-dried to obtain a powdery, tannase-treated "green tea extract 2" (1.0 kg). The thus-obtained "green tea extract 2" had the following data—the concentration of non-polymer catechins: 30.5 wt %, the percentage of gallate body in the non-polymer catechins: 31.6 wt %, and caffeine/non-polymer catechins ratio=0.183.

Example 1

Acid clay ("MIZUKA-ACE #600", product of Mizusawa Industrial Chemicals, Ltd.; 100 g) was dispersed in a 92 wt % aqueous solution of ethanol (800 g) at 25° C. under stirring conditions of 250 rpm. After stirring was conducted for approximately 10 minutes, a mixture of the "green tea extract 1" (120 g) and the "green tea extract 2" (80 g) was charged, and still at room temperature, stirring was continued for approximately 3 hours (pH 4.1). Subsequently, the formed precipitate and the acid clay were filtered off by No. 2 filter paper. Deionized water (417 g) was added to the thus-obtained filtrate, and stirring was conducted at 15° C. for about 5 minutes under stirring conditions of 100 rpm. From the mixed solution, the precipitated turbid components were separated at the operation temperature of 15° C. (6,000 rpm, 5 minutes) by using a small cooled centrifuge (manufactured by Hitachi Koki Co., Ltd.). The separated solution was brought into contact with activated carbon ("KURARAY COAL GLC", product of Kuraray Chemical Co., Ltd.; 30 g), and without a break, was filtered through a 0.2-μm membrane filter. Subsequently, the filtrate was freeze-dried to obtain a "purified green tea extract 1".

In the "purified green tea extract 1", 59.5 wt % of non-polymer catechins were contained, and the percentage of gallate body in the non-polymer catechins was 44.1 wt %. Further, the caffeine/non-polymer catechins ratio=0.061, the non-polymer catechins/total polyphenols ratio=0.928, the epigallocatechin gallate and gallocatechin gallate (EGCg+GCg) =21.8 wt %, flavonols/(EGCg+GCg)=0.00128.

As a result of a taste evaluation, the bitterness was 6.0 and the aftertaste was 6.5.

Example 2

In deionized water (8,415 g), the "green tea extract 2" (85 g) was dissolved at 25° C. under stirring for 30 minutes (tannase-treated solution). A synthetic adsorbent "SP-70" (product of Mitsubishi Chemical Corporation; 2,048 mL) was packed in a stainless steel column 1 (110 mm inner diameter×230 mm height, volume: 2,185 mL). The tannase-treated solution (4 volumes relative to the synthetic adsorbent) was then passed at SV=1 ($h^{-1}$) through the column 1 and the outflow was discarded. The column 1 was then washed at SV=1 ($h^{-1}$) with water (2,048 mL, one volume relative to the synthetic adsorbent). Subsequent to the water-washing, a 50 wt % aqueous solution of ethanol (4,096 mL, 2 volumes relative to the synthetic adsorbent) was passed through at SV=1 ($h^{-1}$) so that a "resin-treated product 1" (4,014 g; pH 4.58) was obtained. Non-polymer catechins were contained at 1.89 wt % in the extract, and the percentage of gallate body in the non-polymer catechins was 36.2 wt %. Further, caffeine amounted to 0.281 wt %. Non-polymer catechins in the solid content of the tea extract amounted to 60.1 wt %.

Granular activated carbon "TAIKO SGP" (product of Futamura Chemical Co., Ltd.; 8.5 g) was then packed in a stainless steel column 2 (22 mm inner diameter×145 mm height, volume: 55.1 mL). The "resin-treated product 1" (1,000 g) was passed at SV=1 ($h^{-1}$) through the column (the amount of the activated carbon was 0.4 times relative to the tannase-treated green tea extract). The filtrate was then freeze-dried to obtain a "resin-treated product 2", which will hereinafter be referred to as a "purified green tea extract 2".

In the "purified green tea extract 2", 77.6 wt % of non-polymer catechins were contained, and the percentage of gallate body in the non-polymer catechins was 26.1 wt %. Caffeine amounted to 0.02 wt %. Further, the caffeine/non-polymer catechins ratio=0.003, the non-polymer catechins/total polyphenols ratio=1.072, EGCg+GCg=18.1 wt %, flavonols/(EGCg+GCg)=0.00017.

As a result of a taste evaluation, the bitterness was 5.0 and the aftertaste was 5.3.

Example 3

A green tea extract ("POLYPHENONE HG", product of Mitsui Norin Co., Ltd.; 100 g) was dispersed in a 70 wt % aqueous solution of ethanol (100 g) at 25° C. under stirring conditions of 250 rpm. After activated carbon ("KURARAY COAL GLC", product of Kuraray Chemical K.K.; 25 g) and acid clay ("MIZUKA-ACE #600", product of Mizusawa Industrial Chemicals, Ltd.; 30 g) were charged, the resulting mixture was continuously stirred for approximately 10 minutes. Subsequent to dropwise addition of a 95 wt % aqueous solution of ethanol (800 g) over 30 minutes, stirring was continued still at room temperature for 30 minutes. The resulting mixture was then filtered again through No. 2 filter paper, and without a break, refiltration was conducted through a 0.2 μm membrane filter. Finally, deionized water (200 g) was added to the filtrate, ethanol was distilled off at 40° C. and 0.0272 $kg/cm^2$. After spray-dry, the resulting powder was dissolved in deionized water such that its concentration became 50 wt %, and centrifugal separation was then performed under conditions of 5° C., 30 minutes and 3,000 rpm. A supernatant obtained as described above was collected and then freeze-dried to obtain a "purified green tea extract 3".

In the "purified green tea extract 3", 44.6 wt % of non-polymer catechins were contained, and the percentage of gallate body in the non-polymer catechins was 46.2 wt %. Further, the caffeine/non-polymer catechins ratio=0.070, the non-polymer catechins/total polyphenols ratio=0.944, EGCg+GCg=16.4 wt %, flavonols/(EGCg+GCg)=0.00311.

As a result of a taste evaluation, the bitterness was 6.5 and the aftertaste was 7.0.

Comparative Example 1

The "green tea extract 1" (120 g) and the "green tea extract 2" (80 g) were mixed. In the mixture, 32.3 wt % of non-polymer catechins were contained, and the percentage of gallate body in the non-polymer catechins was 43.6 wt %. Further, the caffeine/non-polymer catechins ratio=0.181, the non-polymer catechins/total polyphenols ratio=0.806, EGCg+GCg=11.1 wt %, flavonols/(EGCg+GCg)=0.01057.

As a result of a taste evaluation, the bitterness was 6.2 and the aftertaste was 7.3.

Comparative Example 2

In the "green tea extract 1", the concentration of non-polymer catechins=32.8 wt %, the percentage of gallate body in the non-polymer catechins=51.6 wt %, the caffeine/non-polymer catechins ratio=0.193, the non-polymer catechins/total polyphenols ratio=0.809, EGCg+GCg=13.1 wt %, flavonols/(EGCg+GCg)=0.00786.

As a result of a taste evaluation, the bitterness was 7.0 and the aftertaste was 8.0.

Comparative Example 3

In "POLYPHENONE HG" (product of Mitsui Norin Co., Ltd.), 31.9 wt % of non-polymer catechins were contained, and the percentage of gallate body in the non-polymer catechins was 54.6 wt %. Further, the caffeine/non-polymer catechins ratio=0.189, the non-polymer catechins/total polyphenols ratio=0.820, EGCg+GCg=13.4 wt %, flavonols/(EGCg+GCg)=0.00340.

As a result of a taste evaluation, the bitterness was 5.5 and the aftertaste was 8.5.

Comparative Example 4

In "POLYPHENONE 70S" (product of Mitsui Norin Co., Ltd.), 81.8 wt % of non-polymer catechins were contained, and the percentage of gallate body in the non-polymer catechins was 62.3 wt %. Further, the caffeine/non-polymer catechins ratio=0.002, the non-polymer catechins/total polyphenols ratio=0.935, EGCg+GCg=39.9 wt %, flavonols/(EGCg+GCg)=0.00040.

As a result of a taste evaluation, the bitterness was 8.2 and the aftertaste was 8.7.

Comparative Example 5

Water (6 g) was heated to 50° C., at which a green tea extract ("PF-TP80", trade name; product of Pharma Foods International Co., Ltd.) (3 g) and activated clay ("GALLEON EARTH", trade name; product of Mizusawa Industrial Chemicals, Ltd.) (0.075 g) were added, followed by mixing under stirring for 30 minutes. Further, diatomaceous earth ("RADIOLITE", trade name; product of Showa Chemical Industry Co., Ltd.) (0.067 g) was added, and filtration was then conducted to remove the diatomaceous earth, activated clay and insoluble matter. Next, activated carbon ("CARBO-RAFFIN", trade name; product of Japan EnviroChemicals, Ltd.) (0.45 g) was added, followed by mixing under stirring at 50° C. for 30 minutes. Furthermore, powdery cellulose ("KC-FLOC", trade name; product of Nippon Paper Chemicals Co., Ltd.) (0.132 g) was added, and suction filtration was then conducted to remove the activated carbon and powdery cellulose. The thus-obtained aqueous solution was concentrated in an evaporator to obtain a "purified green tea extract 4" (1.31 g).

In the "purified green tea extract 4", 76.2 wt % of non-polymer catechins were contained, and the percentage of gallate body in the non-polymer catechins was 74.6 wt %. Further, the caffeine/non-polymer catechins ratio=0.085, the non-polymer catechins/total polyphenols ratio=0.881, EGCg+GCg=46.1 wt %, flavonols/(EGCg+GCg)=0.00016.

As a result of a taste evaluation, the bitterness was 8.6 and the aftertaste was 9.0.

Example 4

Using the purified green tea extracts of Examples 1 and 2, the beverages described in Table 3 were prepared for packaging application. Under the Food Sanitation Act of Japan, the beverages were subjected to sterilization treatment and then to hot-pack filling so that packaged beverages were produced.

TABLE 3

| Names of Ingredients | Mixed proportions (wt %) |
|---|---|
| Sugar | 1.50 |
| Salt | 0.33 |
| Sweetener | 0.01 |
| VC | 0.05 |
| Fruit extract | 0.10 |
| Flavoring | 0.20 |
| Catechin preparation (Example 1 or 2) | 2.11 |
| Deionized water | Balance |
| Total | 100.00 |

From a comparison between the individual examples and the individual comparative examples in Table 2, it has been found that a purified green tea extract having a taste, which is satisfactory in both bitterness and aftertaste, and suppressed in coloration can be obtained by controlling the weight ratio of flavonols to (EGCg+GCg) in the purified green tea extract to 0.010 or smaller, the percentage of (EGCg+GCg) in non-polymer catechins to from 0.01 to 29 wt %, and the percentage of gallate body in the non-polymer catechins to from 0.01 to 49 wt %. It has also been found that the bitterness and aftertaste can be significantly reduced and improved, respectively, by lowering the percentage of gallate body in the non-polymer catechins down to 26 wt % as in Example 2.

The invention claimed is:

1. A purified green tea extract, which satisfies the following conditions (1), (2) and (3):

(1) a ratio of a sum of content weights of (A) myricetin, (B) quercetin and (C) kaempferol to a sum of content

TABLE 2

| | | Examples | | | Comparative Examples | | | | |
|---|---|---|---|---|---|---|---|---|---|
| | | 1 | 2 | 3 | 1 | 2 | 3 | 4 | 5 |
| Flavonols/(EGCg + GCg) | weight ratio [—] | 0.00128 | 0.00017 | 0.00311 | 0.01057 | 0.00786 | 0.00340 | 0.00040 | 0.00016 |
| EGCg + GCg | wt % | 21.8 | 18.1 | 16.4 | 11.1 | 13.1 | 13.4 | 39.9 | 46.1 |
| Percentage of gallate body in non-polymer catechins | wt % | 44.1 | 26.1 | 46.2 | 43.6 | 51.6 | 54.6 | 62.3 | 74.6 |
| Caffeine/non-polymer catechins | weight ratio [—] | 0.061 | 0.0003 | 0.070 | 0.181 | 0.193 | 0.189 | 0.002 | 0.085 |
| Non-polymer catechins/total polyphenols | weight ratio [—] | 0.928 | 1.072 | 0.944 | 0.806 | 0.809 | 0.820 | 0.935 | 0.881 |
| Non-polymer catechins | wt % | 59.5 | 77.6 | 44.6 | 32.3 | 32.8 | 31.9 | 81.8 | 76.2 |
| EGCg + GCg/non-polymer catechins | weight ratio [—] | 36.6 | 23.3 | 36.8 | 34.4 | 39.9 | 42.0 | 48.8 | 60.5 |
| OD480 nm | | 0.013 | 0.028 | 0.037 | 0.674 | 0.526 | 0.405 | 0.070 | 0.064 |
| Taste evaluation (quinine sulfate method) | Bitterness | 6.0 | 5.0 | 6.5 | 6.2 | 7.0 | 5.5 | 8.2 | 8.6 |
| | Aftertaste | 6.5 | 5.3 | 7.0 | 7.3 | 8.0 | 8.5 | 8.7 | 9.0 | weights of (D) epigallocatechin gallate and (E) gallocatechin gallate, $((A)+(B)+(C))/((D)+(E))$, is from 0.0000001 to 0.010;

(2) a sum of content weights of (D) the epigallocatechin gallate and (E) the gallocatechin gallate in non-polymer catechins, $((D)+(E))$, is from 0.01 to 29 wt%; and (3) a percentage of gallate body in the non-polymer catechins is from 0.01 to 49 wt%.

2. The purified green tea extract according to claim 1, wherein a content weight ratio of (F) caffeine to (G) the non-polymer catechins, $(F)/(G)$, is from 0.0001 to 0.25.

3. The purified green tea extract according to claim 1, wherein a content weight ratio of (G) the non-polymer catechins to (H) total polyphenols, $(G)/(H)$, is from 0.8 to 1.2.

4. A food comprising the purified green tea extract according to claim 1.

5. A beverage comprising the purified green tea extract according to claim 1.

6. The beverage according to claim 5, which is a packaged beverage.

7. The purified green tea extract according to claim 1, wherein the ratio of a sum of content weights of (A) myricetin, (B) quercetin and (C) kaempferol to a sum of content weights of (D) epigallocatechin gallate and (E) gallocatechin gallate, $((A)+(B)+(C))/((D)+(E))$, is from 0.00001 to 0.009.

8. The purified green tea extract according to claim 1, wherein the ratio of a sum of content weights of (A) myricetin, (B) quercetin and (C) kaempferol to a sum of content weights of (D) epigallocatechin gallate and (E) gallocatechin gallate, $((A)+(B)+(C))/((D)+(E))$, is from 0.0001 to 0.0085.

9. The purified green tea extract according to claim 1, wherein the ratio of a sum of content weights of (A) myricetin, (B) quercetin and (C) kaempferol to a sum of content weights of (D) epigallocatechin gallate and (E) gallocatechin gallate, $((A)+(B)+(C))/((D)+(E))$, is from 0.0001 to 0.007.

10. The purified green tea extract according to claim 1, wherein the percentage of gallate body in the non-polymer catechins is from 0.1 to 44 wt%.

11. The purified green tea extract according to claim 1, wherein the percentage of gallate body in the non-polymer catechins is from 1 to 39 wt%.

12. The purified green tea extract according to claim 1, wherein the percentage of gallate body in the non-polymer catechins is from 5 to 29 wt%.

13. The purified green tea extract according to claim 1, wherein the sum of the content weights of (D) epigallocatechin gallate and (E) gallocatechin gallate in the non-polymer catechins in the present invention, $((D)+(E))$, is from 0.01 to 27 wt%.

14. The purified green tea extract according to claim 1, wherein the sum of the content weights of (D) epigallocatechin gallate and (E) gallocatechin gallate in the non-polymer catechins in the present invention, $((D)+(E))$, is from 0.1 to 25 wt%.

15. The purified green tea extract according to claim 1, wherein the sum of the content weights of (D) epigallocatechin gallate and (E) gallocatechin gallate in the non-polymer catechins in the present invention, $((D)+(E))$, is from 1 to 23 wt%.

16. The purified green tea extract according to claim 1, wherein a content weight ratio of (F) caffeine to (G) the non-polymer catechins, $(F)/(G)$, is from 0.001 to 0.15.

17. The purified green tea extract according to claim 1, wherein a content weight ratio of (F) caffeine to (G) the non-polymer catechins, $(F)/(G)$, is from 0.001 to 0.1.

18. The purified green tea extract according to claim 1, wherein a content weight ratio of (F) caffeine to (G) the non-polymer catechins, $(F)/(G)$, is from 0.001 to 0.08.

19. The purified green tea extract according to claim 1, wherein a content weight ratio of (G) the non-polymer catechins to (H) total polyphenols, $(G)/(H)$, is from 0.85 to 1.15.

20. The purified green tea extract according to claim 1, wherein a content weight ratio of (G) the non-polymer catechins to (H) total polyphenols, $(G)/(H)$, is from 0.9 to 1.1.

21. The purified green tea extract according to claim 1, wherein the purified green tea extract contains from 25 to 95 wt% of non-polymer catechins in its solid content.

22. The purified green tea extract according to claim 1, wherein the purified green tea extract contains from 40 to 95 wt% of non-polymer catechins in its solid content.

23. The purified green tea extract according to claim 1, wherein the purified green tea extract contains from 50 to 90 wt% of non-polymer catechins in its solid content.

24. The purified green tea extract according to claim 1, wherein the purified green tea extract contains from 55 to 80 wt% of non-polymer catechins in its solid content.

* * * * *